Aug. 20, 1946.  J. A. FIRSCHING  2,406,140
CLOTH MEASURING DEVICE
Filed April 4, 1944  4 Sheets-Sheet 1
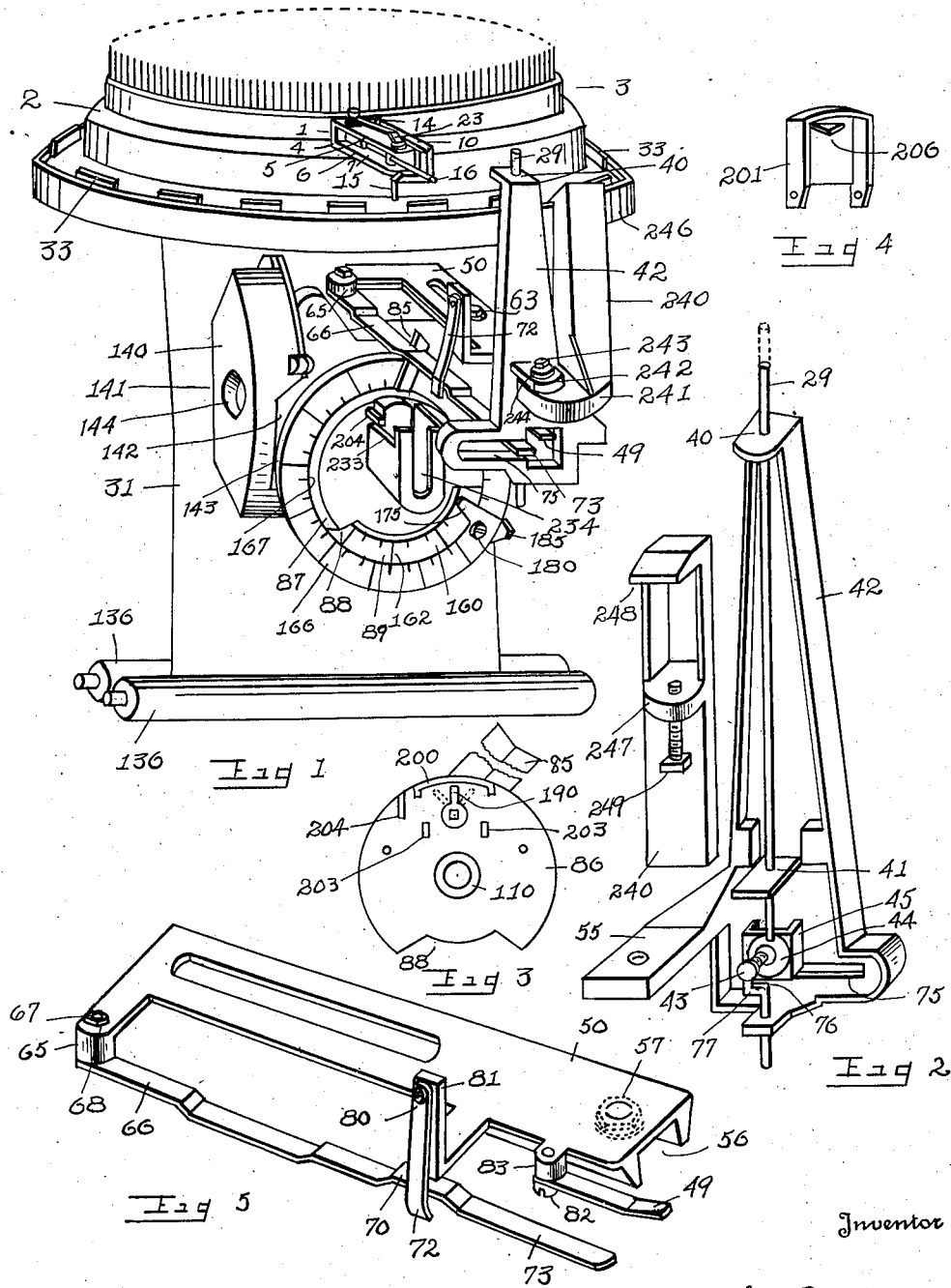
Inventor
Joseph A. Firsching
Thomas L. Wilder
By
Attorney

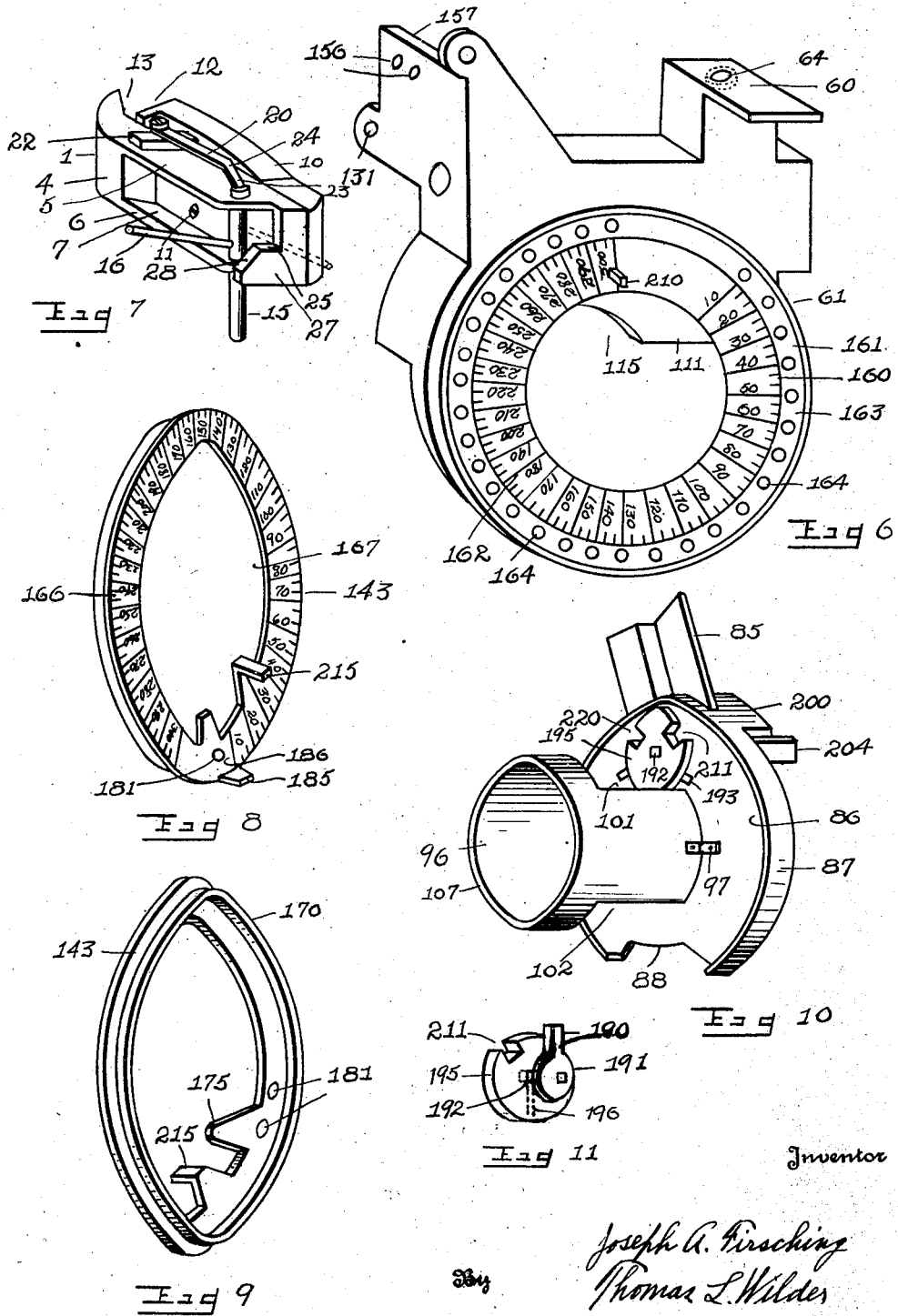

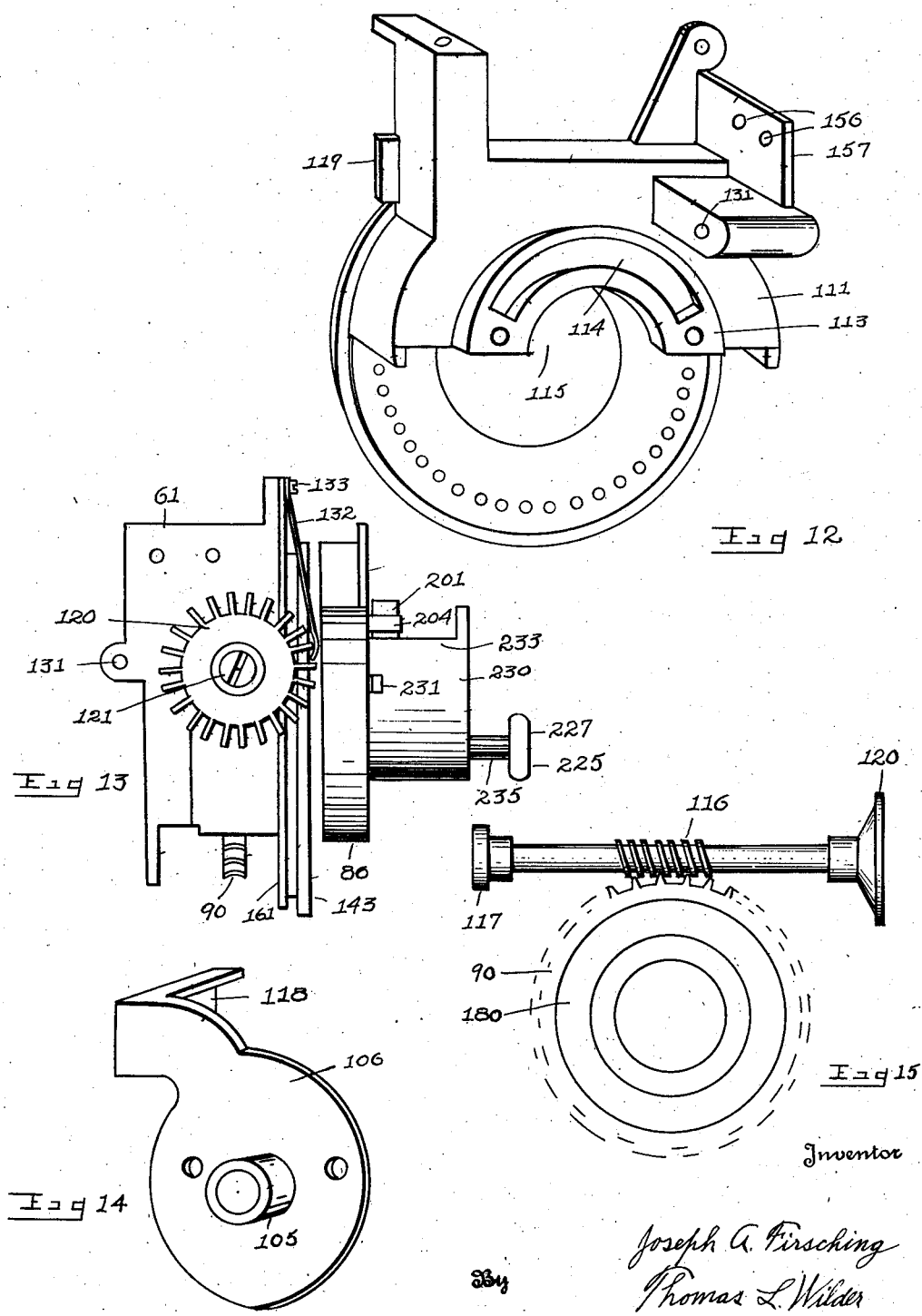

Aug. 20, 1946. J. A. FIRSCHING 2,406,140
CLOTH MEASURING DEVICE
Filed April 4, 1944 4 Sheets-Sheet 4
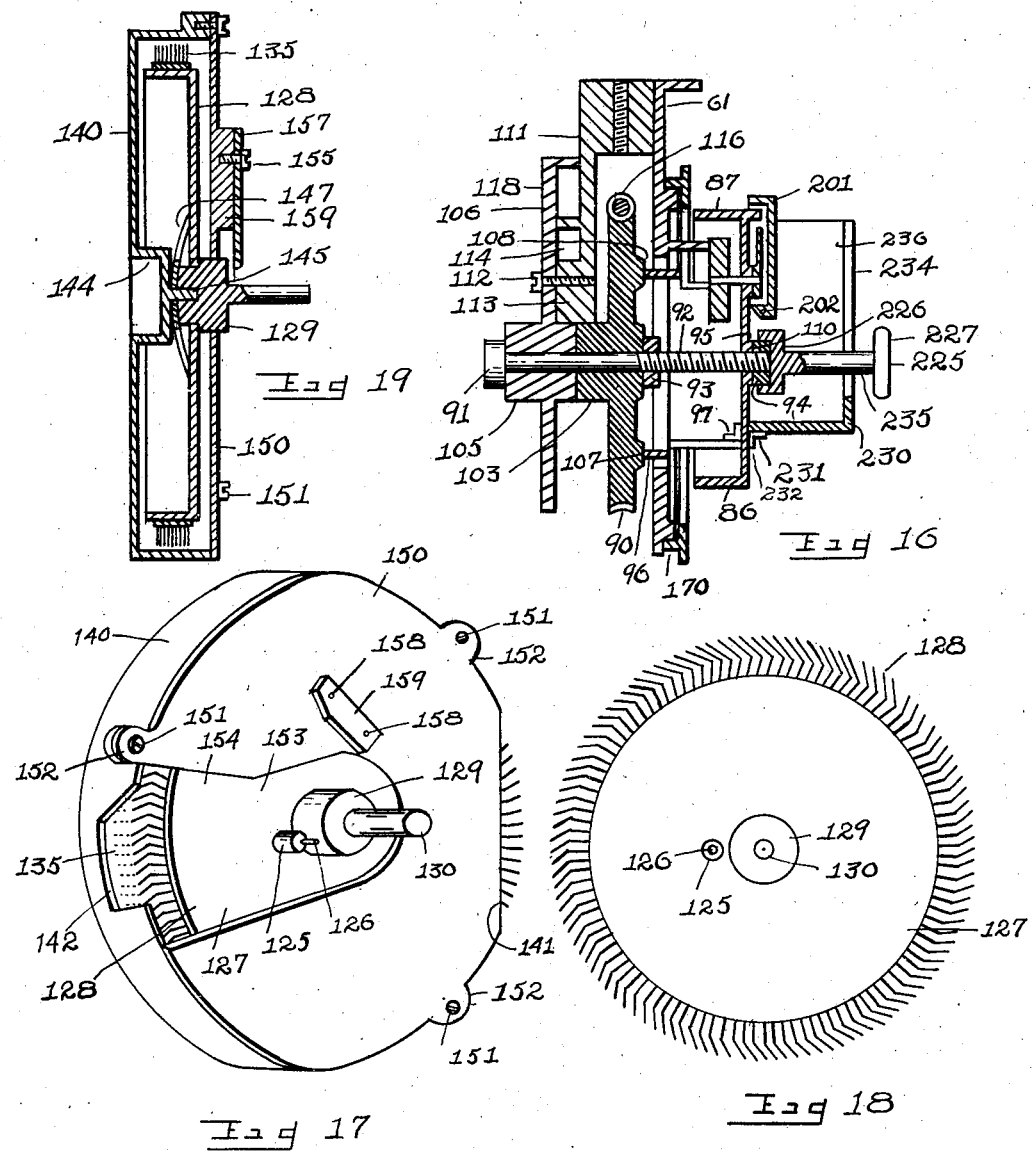
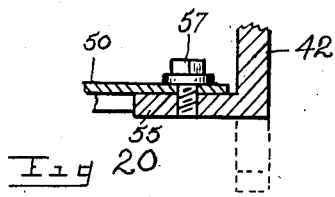
Inventor
Joseph A. Firsching
Thomas L. Wilder
Attorney Patented Aug. 20, 1946

2,406,140

UNITED STATES PATENT OFFICE 2,406,140

CLOTH MEASURING DEVICE

Joseph A. Firsching, Utica, N. Y.

Application April 4, 1944, Serial No. 529,535

7 Claims. (Cl. 66—167)

My invention relates to a cloth measuring device and I declare the following to be a full, clear, concise and exact description thereof sufficient to enable anyone skilled in the art to which it appertains to make and use the same, reference being had to the drawings in which like characters refer to like parts throughout the specification.

The object of the invention is to provide a device that can be attached to a knitting machine especially the cylinder type, whereby to measure off predetermined lengths of cloth and to automatically stop the knitting machine when said machine has knitted said lengths.

The object will be understood by referring to the drawings in which:

Fig. 1 is a perspective view of the device, showing the same attached to a cylinder knitting machine, parts of the knitting machine being omitted.

Fig. 2 is a detail view showing a perspective, somewhat enlarged, of one of the brackets employed in the device, and immediate parts.

Fig. 3 is a detail view showing a plan of a cup shaped disk employed in the device.

Fig. 4 is a detail view, showing a perspective of a cover rock member also employed in the device.

Fig. 5 is a detailed enlarged view, showing a perspective of an adjustable plate and immediate parts, employed in the device.

Fig. 6 is a detail view showing a perspective of a certain housing member employed in the device.

Fig. 7 is a detail view, showing a perspective of a kick off member used in connection with the device, somewhat enlarged.

Fig. 8 is a detail view, showing a perspective of a measuring or graduated ring employed in the device.

Fig. 9 is a detail view, showing the reverse side of the member illustrated in Fig. 8.

Fig. 10 is a detail view enlarged, showing a perspective of the reverse side of the cup shaped member of Fig. 3 and also showing immediate parts connected thereto.

Fig. 11 is a detail view, showing a perspective of an annular member and immediate parts, employed in the device.

Fig. 12 is a detail view showing a perspective of a housing employed and looking at the reverse side of Fig. 6.

Fig. 13 is a detail view showing a side elevation of the device, parts being omitted.

Fig. 14 is a detail view showing a perspective of a bearing bracket employed in the device.

Fig. 15 is a detail view showing an elevation of a certain worm gear and immediate parts employed in the device.

Fig. 16 is a detail view showing a central vertical section of the view shown in Fig. 13.

Fig. 17 is a detail enlarged view of the contact wheel and immediate parts employed in the device.

Fig. 18 is a detail enlarged view showing a side elevation of the contact wheel.

Fig. 19 is a detail view enlarged, showing a central vertical of the view shown in Fig. 17, and connected part broken away.

Fig. 20 is a detail view showing the assembly of brackets 42 and 50, parts being broken away.

Referring more particularly to the drawings a kick off member 1 is attached as hereinafter explained to the rotary portion 2 of the knitting machine 3. Member 1 contemplates a casting or housing 4 having an upper part 5 and lower part 6 separated to form an open recess 7. A clamping member 10 is held by a headed screw bolt 11 to housing 4. Member 10 has a laterally extending part 12 that cooperates with the recessed portion 13 made in the extended end of member 1, whereby to clamp member 1 firmly to a rod 14 upstanding in the rotary part 2 of the knitting machine.

A vertically disposed rod 15 is projected through loose bearings in the upper 5 and lower part 6 of member 1. It is held in member 1 by a horizontally disposed rod 16 which has a tight fit in a suitable aperture in first named rod 15 between upper 5 and lower parts 6 of member 1.

A flat spring 20 is held to the top surface of elevation 22 formed integral with the part 5. The free end of spring 20 rests on the upper surface of vertically disposed rod 15, whereby to hold it normally in lowermost position. The free end 23 of spring 20 is bent at 24 to meet the upper surface of rod 15.

A shelf 25 is formed in the end part 27 of member 1. There rests upon shelf 25 the free end of rod 16 when in cocked position. A cam or inclined surface 28 leads upwards to shelf 25 to form an easy approach for rod 16 when moved manually to cocked position as shown in dotted lines in Fig. 7 or full lines in Fig. 1.

The free end of rod 16 will be engaged by vertically disposed rod 29 when a given unit of cloth 31 has been knitted, whereby to cause rod 16 to move off from shelf 25 and rotate in substantially a half circle clockwise to its lowermost position on the upper surface of lower part 6 of member 1. This actuation of rod 16 will allow rod 15 to move downward under pressure of spring 20, whereby its lower end will engage one of the many upstanding lugs formed integral with the stop or kick off ring of the knitting machine 3. Kick off ring having lugs 33 thereon will be arrested from moving with the circular plate 2 of the knitting machine 3 and thereby shift the belt and brake the rotation of plate 2 of the knitting machine 3, as is well known in the art and to which reference is made for more particular description.

Rod 29 hereinabove mentioned is mounted to slide in bearings 40 and 41 formed in upstanding channel bracket 42. The lower end of rod 29 is held by a set screw 43 in socket part 44 of gib or member 45 formed similar to a shepherd's staff. The lower portion of rod 29 has a loose bearing in horizontally disposed part 41 formed integral with the lower part of bracket 42.

Furthermore, said rod 29 is held normally in upper position illustrated in dotted lines in Fig. 2 by a flat spring 49 hereinafter mentioned. A horizontally adjustable channel bracket 50 is disposed at right angles to bracket 42. It is attached thereto by means of a horizontally disposed member 55 that fits into the channel portion 56 made on the underside of bracket 50 and held by headed bolt 57 and washer thereto.

Bracket 50 is mounted on the top part 60 of housing 61 and held in adjusted position thereto by a washer and headed bolt 63 engaging a threaded aperture 64 made in said housing 61. The free end of bracket 50 has an offset part extending at right angles thereto and is equipped with a socket portion 65. A rock lever or arm 66 fulcrumed on headed bolt 67 which is held in place in socket 65 by nut 68 provides a pivot on which lever 66 can swing. Lever 66 is bent upward at 70 to provide a rest for the lower end of spring 72 hereinafter mentioned. Spring 72 will urge lever 66 normally inward to hold it in cocked position. The free end of arm or lever 66 extends through an elongated recess 75 made in the lower part of upward projecting bracket 42. When in cocked position the free end 73 of lever 66 rests in the recessed part 76 made in the portion 77 of member 45. In this position the upper surface of end 73 or lever 66 will rest against the upper edge of elongated recess 75 and its lower surface against the contiguous surface of recessed part 77 of member 45. Said member 45 is pressed upwardly by leaf spring 49 sufficiently to hold lever 66 in cocked position with the aid of leaf spring 72.

Leaf spring 72 is mounted by screw bolt 80 to upstanding offset bracket 81 formed integral with adjustable bracket 50, whereas leaf spring 49 is fastened by a screw bolt 82 to socket member 83 made integral with bracket 50.

The means for kicking rock arm or lever 66 free from its position in the recessed part 76 of portion 77 of member 45 contemplates a finger 85 formed integral with open cup shaped cloth measuring disk 86 having an annular wall 87. Finger 85 extends outwardly and at an angle from wall 87. It is formed in the shape of a double angle iron. Said disk 86 and wall 87 are cut away at 88 to expose the graduated scale on the annular face of member 89 made integral with housing 61 hereinabove mentioned.

The means for rotating disk 86, whereby finger 85 will kick off lever 66, embodies a worm gear 90 mounted to turn on headed shaft 91 which is threaded at 92 for screw mounting nuts 93 and 94 hereinafter mentioned. Disk 86 is mounted also to turn on shaft 91 and for this purpose has a central bearing at 95.

An open ended cylinder or member 96 is attached by lugs 97 to the inner face of disk 86 and is disposed concentric to wall 87 thereof although of smaller diameter. The wall of the cylinder 96 is cut away at 101 and directly thereneath at 102, the lower opening coincides with the cut away portion 88 of disk 86. Worm gear 90 is provided with a bushing 103 and is held in given position on shaft 91 by nut 93 at one end and by bushing 105 formed integral with supporting bearing bracket 106 at the other. Shaft 91 has a bearing in bracket 106.

The inner peripheral edge 107 of cylinder 96 abuts against a raised annular ridge 108 formed integral with the adjacent surface of worm gear 90 and is held tightly thereagainst, whereby to rotate therewith by nut 94 screw mounted on shaft 91 and pressed against the adjacent surface 110 of disk 86.

Bearing bracket 106 is held to the outer surface 111 of housing 61 by screw bolts 112, 112 that engage threaded apertures in the raised portion 113 of surface 111. Surface 111 has an indenture or hollow sector at 114 to reduce weight. The lower half of surface 111 is cut away to allow for the assembling of worm gear 90. Also a semi-circular recess 115 is made in surface 111 for the disposition of bushing 105.

The means for turning worm gear 90 contemplates a headed worm 116 having bearings in the upper inner portion of housing 61. Head 117 of worm 116 is enclosed by a channel portion 118 of bearing bracket 106, which fits against plate 119 extending from housing 61 and made integral therewith, whereby to prevent unauthorized persons tampering therewith. A star wheel 120 is mounted to the opposite end of worm 116 by a headed set screw 121 which holds it tightly to said worm 116, whereby to turn therewith. Wheel 120 is turned intermittently by arbor or pin 125 reduced at 126 and projecting laterally from the side of disk 127 of rotatable contact wheel 128. Arbor 125 is located adjacent hub 129 of said disk 127. Hub 129 is formed integral with disk 127 and is reduced in diameter at 130 to provide a bearing axle which fits loosely into bearing 131 made integral with housing 61 and turns therein. Flat spring 132 fastened at 133 to housing 61 prevents wheel 120 from spinning.

Rotatable contact wheel 128 is equipped with bent wire toothed cloth gripping surface 135 which makes contact with the knitted cloth 31 as it comes down from the knitting machine 3, aided by rollers 136, 136, whereby to rotate wheel 128 and thereby cause arbor 125 to mesh intermittently with the teeth of star wheel 120 to turn said wheel 120 a predetermined degree once every revolution of contact wheel 128. This rotation of star wheel 120 intermittently will in turn rotate worm 116, worm gear 90 and cup shaped disk 86, whereby to cause finger 85 to kick off rock arm or lever 66 free from member 45 as hereinafter more fully explained.

Contact wheel 128 is housed in a circular cup-shaped casing 140 having an opening at 141 to allow a portion of contact wheel 128 to extend therebeyond to reach knitted cloth 31 as it comes down from the knitting machine 3. Casing 140 has an opening opposite at 142 to clear graduated annular ring 143 hereinafter described.

Cup shaped casing 140 has a central hub 144 formed by indenting the outer lateral surface of casing 140. A centrally disposed bearing member 145 is made integral with hub 144. It fits into a loose bearing made in the under side of hub portion 129 of contact wheel 128, whereby to provide a bearing therefor.

A four armed leaf or flat spring 147 is used in connection with bearing 145 to prevent contact wheel 128 from spinning. A disk shaped cover plate 150 is fitted to the open side of cup shaped casing 140 and is held thereto by screw bolts 151 projected through extended lugs 152 of plate 150 and engaging threaded apertures in complementary lugs formed integral with the annular wall of casing 140.

Cover plate 150 has a central aperture 153 for the projection of bearing axle 130. Said aperture 153 is widened at 154 to conform to opening 142.

The means for holding casing 140 to housing 61 embodies screw bolts 155, 155 projected through apertures 156, 156 in upstanding plate 157 made integral with housing 61 and engaging threaded apertures 158, 158 in upstanding lug 159 formed in plate 150.

The means for measuring the yardage or unit of cloth to be knitted embodies a raised graduated annular scale 160 made on the front surface 161 of housing 61. The scale has graduated raised lines 162 with raised numbers 10 to 300 representing yardage or any predetermined units of cloth 31. An outer slightly raised peripheral ring 163 formed integral with surface 161 of housing 61 is equipped with small threaded apertures 164 located opposite the ends of lines 162.

A complementary annular rotatable ring member 143 having a graduated scale 166 similar to scale 160 cooperates therewith to predetermine the length of the unit of cloth 31 to be knitted. Ring 143 has a large central opening 167, whereby when fitted onto the raised graduated scale 160 both graduated scales 160 and 143 will be visible. However, scale 160 is concentric with scale 143.

Ring member 143 has an annular rearwardly extending ridge 170 that fits over the peripheral edge of raised ring 163 formed on surface 161, whereby to hold ring member 143 in given relation to scale 160 and yet allow it to turn relative thereto.

The means for accurately setting ring 143 relative to scale 160 embodies an index finger 175 extending inwardly from ring 143 and in the same plane therewith. An aperture 181 is made in ring 143 for the projection of screw bolt 180 to engage one of the threaded apertures 164 of housing 61, whereby to hold ring 143 in predetermined position or relation to scale 160.

Assuming it is desirable to set ring 143 in such position that the knitting machine 3 will measure off 90 yards or units of cloth 31 and then stop, the operator will turn ring 143 until the edge of finger 175 coincides with the graduated line corresponding to number 90 on scale 160 and then insert screw bolt 180 to hold ring 143 in place.

It will be observed that scale 166 is graduated in the opposite direction from scale 160, whereby the numbers 90 and 10 coincide as in the above example.

The means for limiting the extreme position to which finger 85 of cup disk 86 can be turned to initial starting position for knitting 90 units of cloth 31 embodies a stop member 185 upstanding at right angles on the outer peripheral edge of ring 143. Member 185 has its stop edge in line with the zero line 186 of ring 143.

The means for preventing an unauthorized person from unscrewing nut 94 during the interval it takes for finger 85 to travel from its resting position against stop 185 until it reaches numeral 90 on scale 166 contemplates pointer 190 formed on hub 191 which has an arbor 192 resting in a bearing in wall of member 86. An annular member 195 is mounted to the opposite end of arbor 192 which is squared for the purpose and for causing member 195 and pointer 190 to turn together as one piece. A flat three pronged spring 193 is interposed to prevent spinning of member 195 and pointer 190. Set screw 196 is used to hold member 195 to arbor 192.

A shelf 200 extending outwardly from cup shaped disk 86 forms a closing member to protect pointer 190 from being moved by an unauthorized person. An open sided covering member 201 shown in detail in Fig. 4 is provided to swing from its top outwardly on a pivot pin 202 having bearings in lugs 203—203 formed integral with the front wall of cup shaped disk 86. A member 204 outstanding from the wall of cup member 86 and made integral therewith provides a guide slot for the adjacent side wall of closing member 201.

A triangular shaped tooth 206 is made integral with the wall of member 201 and near the top thereof and stands out therefrom. When pointer 190 is in the central position, illustrated in Fig. 3 the tooth 206 of covering member 201 will interfere with the contiguous surface of pointer 190 and thereby prevent said cover member 201 from rocking to closed position. However, when pointer 190 is moved to either dotted line position illustrated in Fig. 3 said tooth 206 will be allowed to rock to closed position without interfering with pointer 190.

The means for rocking pointer 190 to either dotted line position shown in Fig. 3 contemplates an outstanding stationary lug or tappet 210 formed integral with front surface 161 of housing 61. Tappet 210 will engage recessed portion 211 made in annular member 195 when said cup shaped disk 86 carrying finger 85 is turned anti-clockwise to such position that recessed portion 211 comes opposite and enters staitonary tappet 210. At this interval tappet 210 will cause the rotation of annular member 195 and of pointer 190 to the right hand position of dotted lines illustrated in Fig. 3, whereby member 201 can be rocked to key releasing position free of the interference of tooth 206 with pointer 190.

At the other end or initial position of cup disk 86 the same functions will be performed by outstanding lug or tappet 215 made integral with the outer surface of ring 143 and on that portion thereof that extends slightly into the central aperture 167. In this instance tappet 215 engages the recessed portion 220 in annular member 195 and turns it anti-clockwise to move pointer 190 to the dotted line position shown at the left in Fig. 3.

In both of the above cases when the recessed portions 211 and 220 move away from their respective tappets 210 and 215, member 195 and pointer 190 will be returned to central or key locking position shown in Fig. 3.

The means for turning nut 94 which holds cup shaped disk 86 tightly with its cylinder 96 against the lateral surface of worm gear 90 contemplates key 225 having a socket wrench head 226 and a handle or finger part 227. When nut 94 is screwed tightly against surface of disk 86, said disk 86 will turn with worm gear 90, whereby to move finger 85 from initial position on stop 185 to kick off position against rock lever 66.

The means to prevent the inserting of key 225 during this interval embodies a casing 230 having lugs 231, 231 that are riveted or welded at 232 to the outer surface of member 86. Casing 230 is open at its top portion and has a cut away part 233 to allow for lug or member 204. There is also a narrow opening at 234 in the front surface sufficient to admit the shaft portion 235 of key 225 from above.

When cover member 201 is rocked away from surface 86 by pointer 190 moving against tooth 206 of member 201 the outer free portion of cover 201 will be sufficiently near the front surface 236 of casing 230 to prevent the insertion of key 225 for turning nut 90. Only at the initial and final positions can key 225 be inserted. In other positions tooth 206 will interfere with pointer 190 to prevent the rocking of cover member 201 to key inserting positions.

The means for holding the measuring device to the knitting machine 3, contemplates a bracket 240 having a horizontal shelf 241 resting beneath a like part 242 extending horizontally from upstanding bracket 42 and held thereto by headed bolt 243 and washer 244. Bolt 243 is projected downwardly through a loose aperture in supporting member 242 and into a threaded aperture in part 241 of bracket 240, whereby said bracket 240 can be rocked relative to bracket 42, if necessary.

The upper part of bracket 240 has formed integral therewith clamping jaws 247 and 248, whereby to engage the stationary base cylinder 246 of the knitting machine 3, and is held tightly thereto by a set bolt 249 mounted in a threaded aperture in lower jaw 247 of the clamp.

In order to operate the device, let us assume that it is desirable to knit 90 yards or units of cloth 31 and thereupon stop the knitting machine 3. To this end the operator will first adjust graduated ring 143 relative to graduated scale 160, whereby the zero line 186 on ring 143 will be opposite line corresponding to 90 on scale 160. Thereupon the operator will insert screw bolt 180 through the aperture 181 in ring 143 to engage the threaded aperture 164 in housing 61. Cup shaped disk 86 carrying cylinder 96 will be inserted in place with ridge 107 of cylinder 96 abutting against annular ridge 108 formed on the near surface of worm gear 90 and then rotated to initial position with finger 85 resting on stop 185.

As cup shaped disk 86 moves into initial position the recessed portion 220 in annular member 195 will move into engagement with tappet 215, whereby pointer 190 will be moved off center to allow cover member 201 to be rocked into key inserting position. The operator will insert key 225 and turn nut 94 tightly against the contiguous surface of cup disk 86 to press edge 107 of cylinder 96 against the ridge 108 in lateral side of worm gear 90, whereby disk 86 and finger 85 carried thereon will turn with worm gear 90. Key 225 will be withdrawn then and the knitting machine 3 started, whereupon contact wheel 128 with its surface resting on cloth 31 will revolve and through the medium of star wheel 120, worm 116, worm gear 90, cause disk 86 and finger 85 to revolve anticlockwise. When disk 86 carrying annular member 195 starts to move, said member 195 will be rotated by its contact with movable tappet 215 sufficiently to bring pointer 190 to central position to rock covering member 201 outward, whereby to prevent the insertion of key 225 in casing 230 until finger 85 has reached and kicked off lever 66 and the knitting machine 3 is stopped. At this later position the recessed portion 211 of annular member 195 will be engaged by stationary tappet 210 and cause the turning of pointer 190 clockwise to allow member 201 to rock to key inserting position, whereby key 225 can be inserted to turn nut 94 to release cup shaped member or disk 86 carrying cylinder 96 from worm gear 90. Said member 86 can be turned then manually back to starting or initial position.

Moreover, the release of rock member or lever 66 from recessed portion 76 of member 45 will allow rod 29 to move upwards under pressure of flat spring 49 to its upper dotted line position shown in Fig. 2, whereby its upper end will be in the path of the free end of rod 16 when it comes around on the next revolution of rotary part 2 of the knitting machine 3.

Rod 16 will be moved thereupon off from shelf 25 to permit vertically disposed rod 15 to move downward into engagement with one of the lugs 33 of kick off ring 34, whereby to shift the belt, not shown, of the knitting machine 3 and to apply the brake to stop its motion.

The aforesaid movements will be repeated as often as it is desirable to knit 90 units of cloth of equal length. In the event a longer or shorter length of cloth is desired, the graduated ring 143 will be set relative to scale 160.

Having thus described my invention what I claim as new and desire to secure by Letters Patent is as follows:

1. In a cloth measuring device for knitting machines, a cloth contact wheel, a gear turned by said wheel, a cup shaped disk, means for holding said disk to turn with said gear, a rod held latched in inoperative position for actuating the stop motion of a knitting machine, and a member carried by said disk, whereby to release said rod.

2. In a cloth measuring device for knitting machines, a cloth contact wheel, a star wheel actuated by said contact wheel, a gear actuated by said star wheel, a measuring cup shaped disk actuated by said gear, a stop member actuated by said disk, and means for locking said disk against said gear.

3. In a cloth measuring device for knitting machines, a wheel for making contact with said cloth, a star wheel actuated by said contact wheel, a gear actuated by said star wheel, a cup shaped disk carrying a cylinder actuated by said gear, means carried by said disk for locking said cylinder against said gear, an annular member mounted to turn on said disk, and tappets mounted on said device for actuating said annular member to release the locking means.

4. In a cloth measuring device for knitting machines, a measuring member, a wheel intermediately connected to said measuring member, whereby to actuate the same, a rock cover carried by said measuring member, a tooth formed on said rock cover, a member for interfering with said tooth, thereby to hold said rock cover in predetermined position, and means for actuating said last member to releasing position.

5. In a cloth measuring device for knitting machines having a stop motion, a wheel for making contact with said cloth, a worm gear actuated by said wheel, a measuring member actuated by said last named wheel, means carried by said measuring member for holding it to turn with said worm gear, and other means carried by said measuring member for actuating the stop motion of the knitting machine.

6. In a cloth measuring device for knitting machines having a stop motion, a cloth measuring disk, a finger attached to said disk for actuating said stop motion, a worm gear for actuating said disk, a cylinder attached to said disk and making contact with said gear, means for holding said cylinder to turn with said gear, a pointer member mounted to turn on said disk, a rock member mounted to cover said pointer, and means for automatically turning said pointer, whereby to allow said cover member to move into releasing position.

7. In a cloth measuring device for knitting machines, a stop motion, a cloth measuring cup shaped disk, a finger attached to said disk for actuating said stop motion, a gear for actuating said cup shaped disk, means for holding said cup shaped disk to turn with said gear and means for releasing said disk from said gear.

JOSEPH A. FIRSCHING.